US012579052B2

(12) United States Patent
Goel et al.

(10) Patent No.: US 12,579,052 B2
(45) Date of Patent: Mar. 17, 2026

(54) MACHINE LEARNING-BASED DEVICE MATRIX PREDICTION

(71) Applicant: Smart Software Testing Solutions, Inc., Dublin, CA (US)

(72) Inventors: Pankaj Goel, Dublin, CA (US); Dimpy Sharma, Haryana (IN)

(73) Assignee: Smart Software Testing Solutions, Inc., Dublin, CA (US)

( * ) Notice: Subject to any disclaimer, the term of this patent is extended or adjusted under 35 U.S.C. 154(b) by 0 days.

(21) Appl. No.: 18/944,733

(22) Filed: Nov. 12, 2024

(65) Prior Publication Data

US 2025/0181484 A1 Jun. 5, 2025

Related U.S. Application Data

(60) Provisional application No. 63/615,636, filed on Dec. 28, 2023.

(30) Foreign Application Priority Data

Nov. 9, 2023 (IN) ............................. 202341076620

(51) Int. Cl.

*G06F 9/44* (2018.01)
*G06F 9/455* (2018.01)
*G06F 11/3668* (2025.01)

(52) U.S. Cl.

CPC .......... *G06F 11/3672* (2013.01); *G06F 9/455* (2013.01)

(58) Field of Classification Search

CPC ............................. G06F 11/3672; G06F 9/455
See application file for complete search history.

(56) References Cited

U.S. PATENT DOCUMENTS 11,334,343 B1 5/2022 Gupta
2006/0026162 A1 2/2006 Salmonsen
(Continued)

OTHER PUBLICATIONS

International Application No. PCT/US2024/055521, International Search Report and Written Opinion dated Feb. 5, 2025.

*Primary Examiner* — Hang Pan
(74) *Attorney, Agent, or Firm* — Ahmann Kloke LLP

(57) ABSTRACT

Storing a set of emulated devices, the set of emulated devices including a plurality of different emulated devices. Obtaining one or more filter parameters. Selecting, based on the filter parameters, a subset of emulated devices from the set of emulated devices. Initiating testing of an application on a particular emulated device of the subset of emulated devices. Obtaining, at run-time while the application is being tested, first error log data from the testing of the application on the particular emulated device of the subset of emulated devices. Parsing, at run-time while the application is being tested, the first error log data, thereby generating a set of first error log data components. Adjusting, at run-time while the application is being tested, one or more weights of a machine learning model based on the set of first error log data components. Providing, at run-time while the application is being tested, the set of first error log data components to the machine learning model. Determining, at run-time while the application is being tested by the machine learning model based on the set of the first error log data components, a second subset of emulated devices from the set of emulated devices, wherein each emulated device of the second subset of emulated devices correlates to at least one of the first error log data components of the set of first error log data components. Testing the application on at least one of the second subset of emulated devices.

21 Claims, 10 Drawing Sheets

(56) References Cited

U.S. PATENT DOCUMENTS

| | | | | |
|---|---|---|---|---|
| 2010/0318993 | A1 | 12/2010 | Goud | |
| 2014/0081616 | A1 * | 3/2014 | Poulin | G06F 11/3668<br>703/22 |
| 2019/0235997 | A1 * | 8/2019 | Mitchell | G06F 11/3688 |
| 2020/0313999 | A1 | 10/2020 | Lee | |
| 2021/0157665 | A1 * | 5/2021 | Rallapalli | G06F 11/3068 |
| 2022/0414968 | A1 | 12/2022 | Wiegert | |
| 2023/0006912 | A1 | 1/2023 | Liu | |

* cited by examiner

200

Machine Learning-Based Device Matrix Prediction System 202

| Management Engine 204 | Device Filter Engine 206 | Testing Engine 208 | Log Generation Engine 210 | Parsing Engine 212 |
| --- | --- | --- | --- | --- |
| Scraping Engine 214 | ML Model Tuning Engine 216 | ML-based Device Matrix Prediction Engine 218 | Presentation Engine 220 | ML Model Generation Engine 222 |

Communication Engine 224

Machine Learning-Based Device Matrix Prediction System Datastore 230

| ML Models 232 | Devices 234 | Logs 236 | Log Components 238 |
| --- | --- | --- | --- |
| Scraped Data 240 | Prediction Results 242 | Test Results 244 | Device Filters 246 |
| Application Data 248 | Devices (e.g., emulated devices) 250 | | |

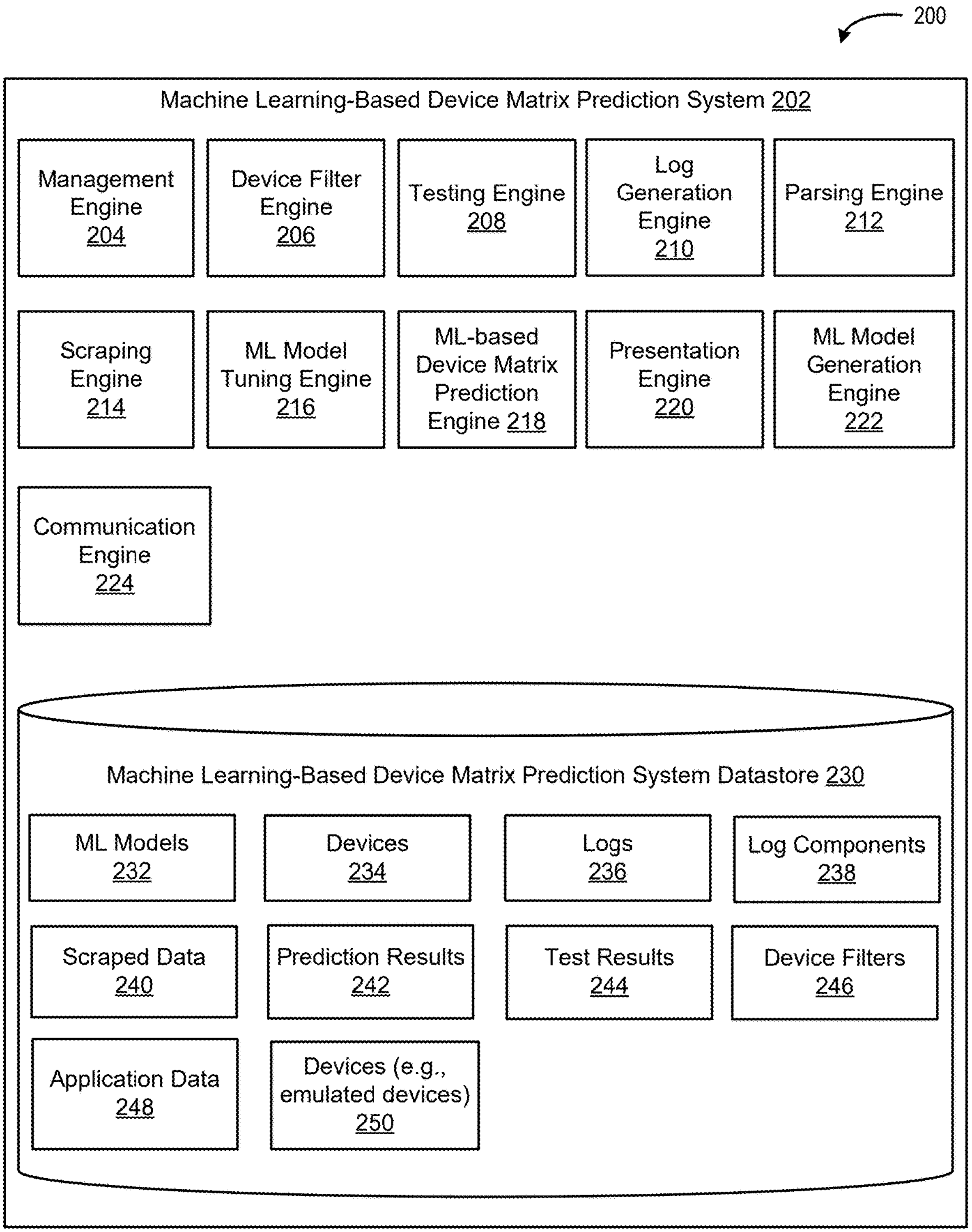

Storing a set of emulated devices 302

Obtaining one or more filter parameters 304

Selecting, based on the filter parameters, a subset of emulated devices from the set of emulated devices 306

Initiating testing of an application on a particular emulated device of the subset of emulated devices 308

Obtaining, at run-time while the application is being tested, first error log data from the testing of the application on the particular emulated device of the subset of emulated devices 310

Parsing, at run-time while the application is being tested, the first error log data, thereby generating a set of first error log data components 312

Adjusting, at run-time while the application is being tested, one or more weights of a machine learning model based on the set of first error log data components 314

Providing, at run-time while the application is being tested, the set of first error log data components to the machine learning model 316

Determining, at run-time while the application is being tested by the machine learning model based on the set of the first error log data components, a second subset of emulated devices from the set of emulated devices, wherein each emulated device of the second subset of emulated devices correlates to at least one of the first error log components of the set of first error log components 318

Testing the application on at least one of the second subset of emulated devices 320

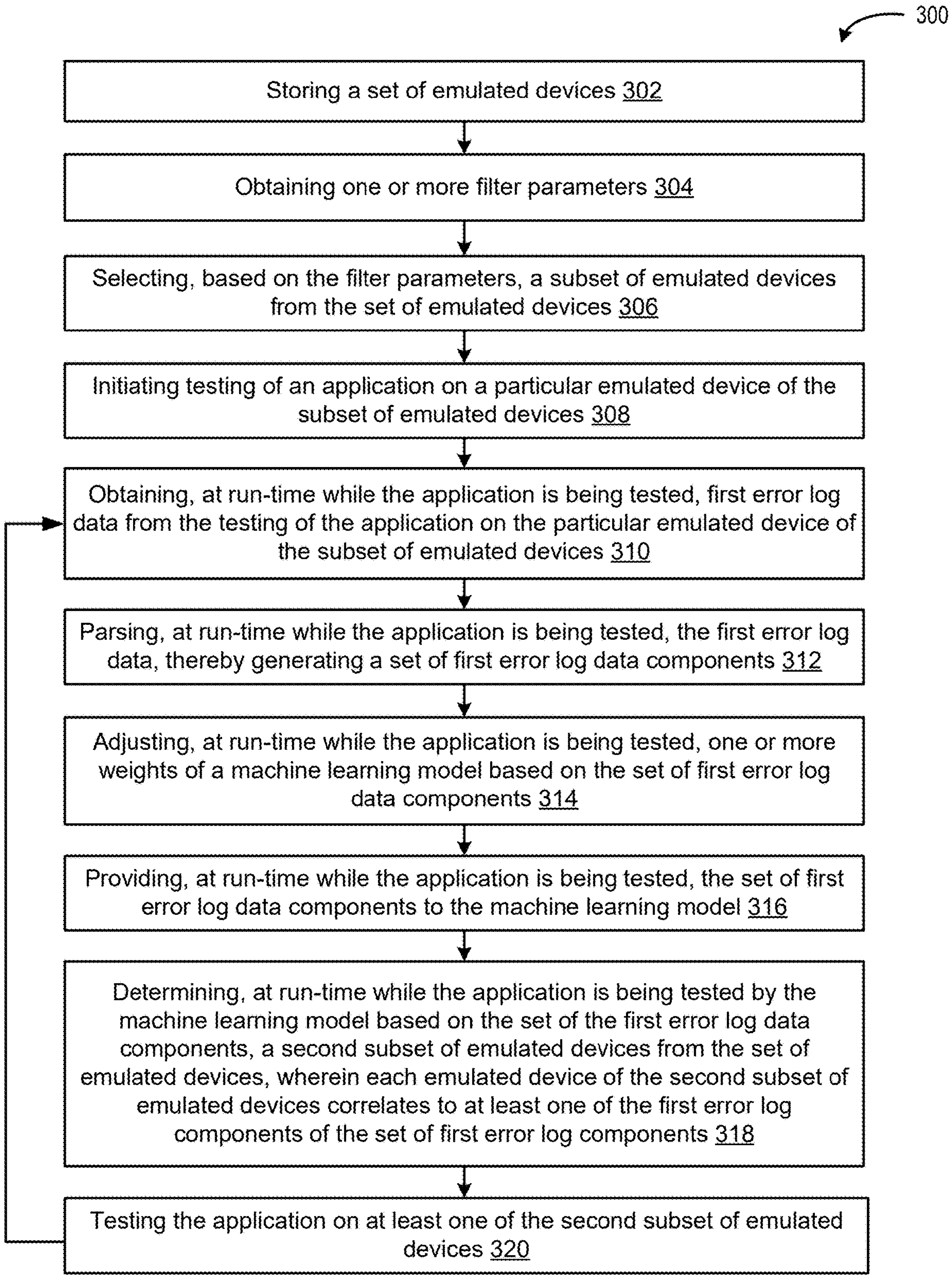

Storing a set of emulated devices 402

Obtaining one or more first filter parameters 404

Selecting, based on the filter parameters, a subset of emulated devices from the set of emulated devices 406

Initiating testing of an application on a particular emulated device of the subset of emulated devices 408

Obtaining, at run-time while the application is being tested, first error log data from the testing of the application on the particular emulated device of the subset of emulated devices 410

Parsing, at run-time while the application is being tested, the first error log data, thereby generating a set of first error log data components 412

Adjusting, at run-time while the application is being tested, one or more weights of a machine learning model based on the set of first error log data components 414

Providing, at run-time while the application is being tested, the set of first error log data components to the machine learning model 416

Determining, at run-time while the application is being tested by the machine learning model based on the set of the first error log data components, a second subset of emulated devices from the set of emulated devices, wherein each emulated device of the second subset of emulated devices correlates to at least one of the first error log components of the set of first error log components 418

Testing the application on at least one of the second subset of emulated devices 420

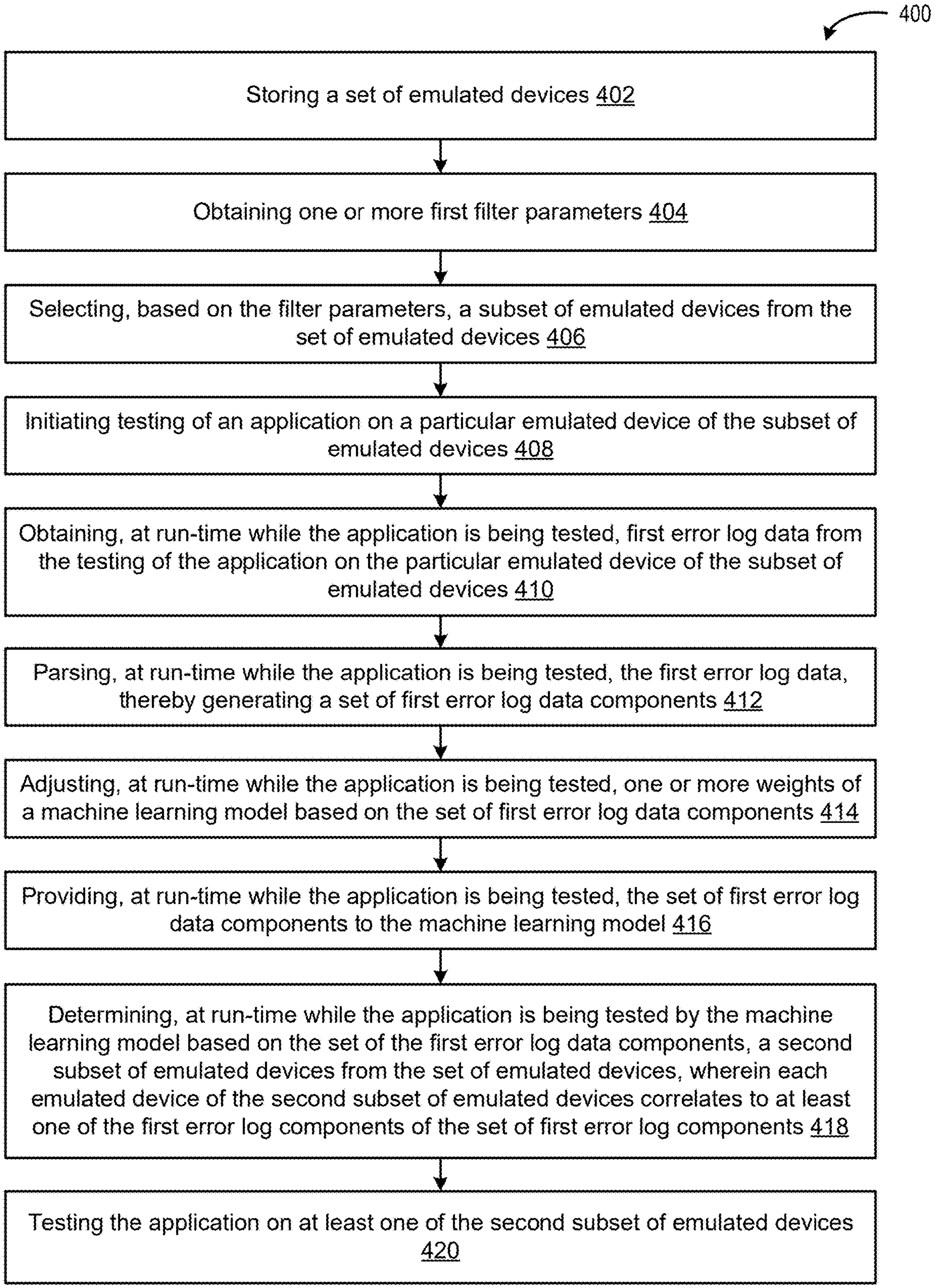

Obtaining, at run-time while the application is being tested on the at least one of the second subset of emulated devices, second error log data from the testing of the application on the at least one of the second subset of emulated devices 422

Parsing, at run-time while the application is being tested on the at least one of the second subset of emulated devices, the second error log data, thereby generating a set of second error log data components 424

Adjusting, at run-time while the application is being tested on the at least one of the second subset of emulated devices, one or more weights of the machine learning model based on the set of second error log data components 426

Providing, at run-time while the application is being tested on the at least one of the second subset of emulated devices, the set of second error log data components to the machine learning model 428

Determining, at run-time while the application is being tested on the at least one of the second subset of emulated devices, by the machine learning model based on the set of the second error log data components, a third subset of emulated devices from the set of emulated devices, wherein each emulated device of the third subset of emulated devices correlates to at least one of the second error log components of the set of second error log components 430

Testing the application on at least one of the third subset of emulated devices 432

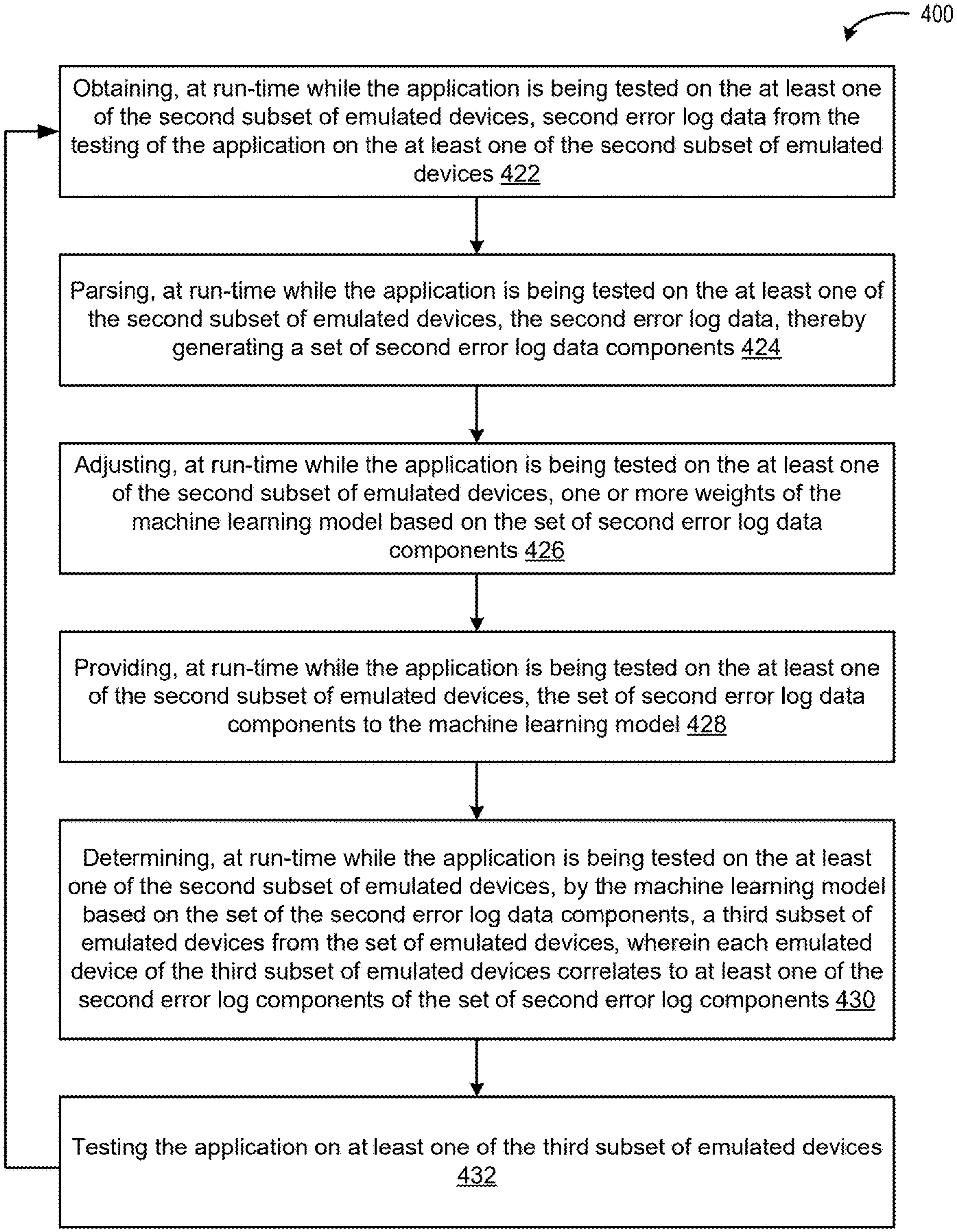

FIG. 4B

MACHINE LEARNING-BASED DEVICE MATRIX PREDICTION

CROSS-REFERENCE TO RELATED APPLICATIONS

The present application claims priority to Indian Provisional Patent Application No. 202341076620 filed Nov. 9, 2023 and U.S. Provisional Patent Application Ser. No. 63/615,636 filed Dec. 28, 2023, each of which is incorporated by reference herein.

BRIEF DESCRIPTION OF THE DRAWINGS

FIG. 2 is a diagram of an example of a machine learning-based device matrix prediction system.

FIG. 3 is a flowchart of an example of a method of machine learning-based device matrix prediction.

FIGS. 4A-B is a flowchart of an example of a method of machine learning-based device matrix prediction.

DETAILED DESCRIPTION

Figure 1:
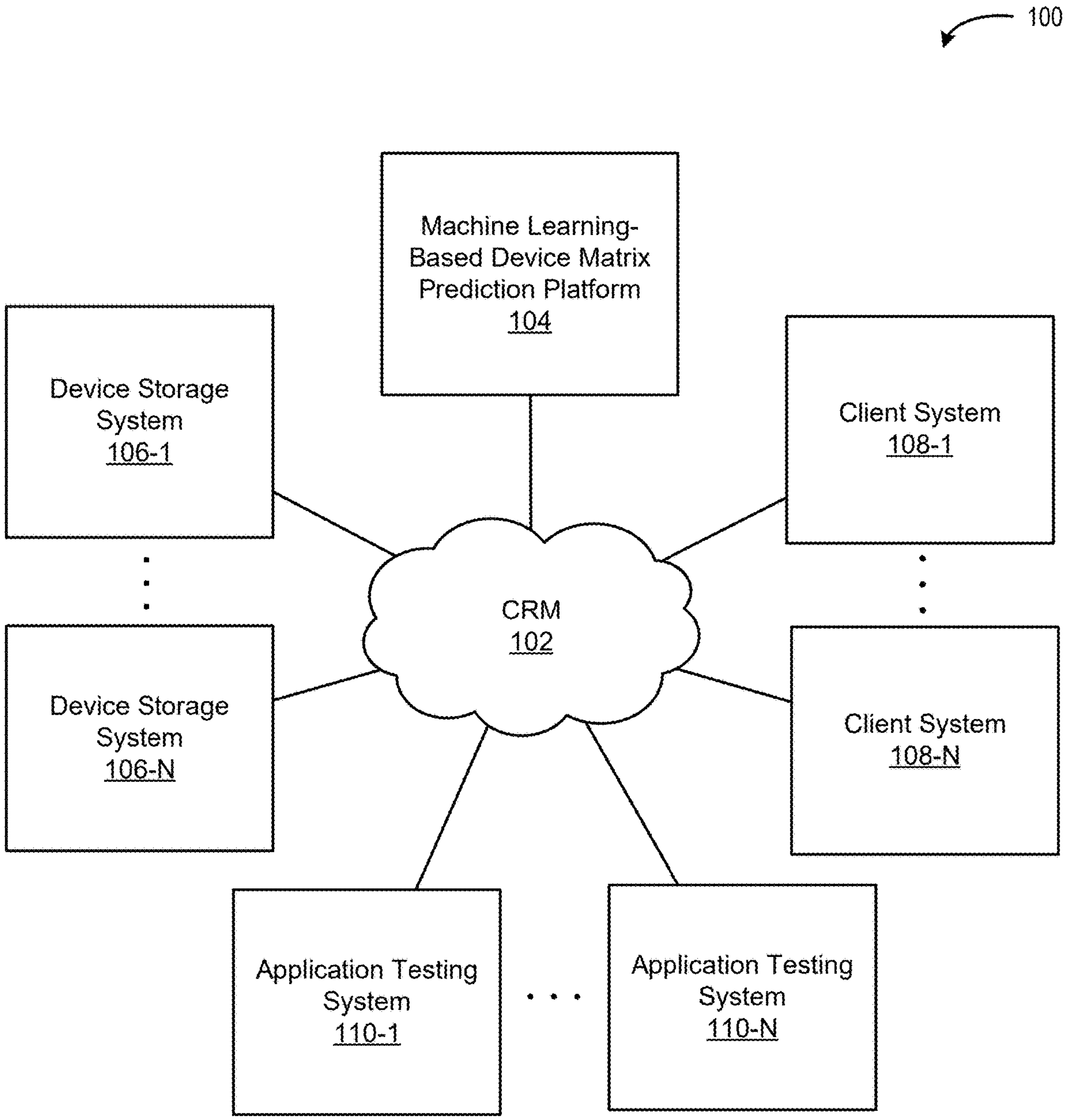
FIG. 1 is a diagram of an example of a system for machine learning-based device matrix prediction.

FIG. 1 is a diagram 100 of an example of a system for machine learning-based device matrix prediction. The diagram 100 includes a computer-readable medium (CRM) 102, a machine learning-based device matrix prediction platform 104 coupled to the CRM 102, device storage systems 106-1 to 106-N (individually, the device storage system 106, collectively, the device storage systems 106) coupled to the CRM 102, client systems 108-1 to 108-N (individually, the client system 108, collectively, the client systems 108) coupled to the CRM 102, and application testing systems 110-1 to 110-N coupled to the CRM 102.

The CRM 102 in intended to represent a computer system or network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

Memory of a computer system includes, by way of example but not limitation, random access memory (RAM), such as dynamic RAM (DRAM) and static RAM (SRAM). The memory can be local, remote, or distributed. Non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to run, if necessary, it is moved to a computer-readable location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an IDSN modem, a cable modem, and other modems. Network interfaces can include, by way of example but not limitation, a token ring interface, a satellite transmission interface (e.g., "direct PC"), or other network interface for coupling a first computer system to a second computer system. An interface can be considered part of a device or computer system.

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general-or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

Assuming a CRM includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

The machine learning-based device matrix prediction system 104 can function to predict and/or recommend one or more devices to test (e.g., during application development). As used in this paper, devices can refer to physical devices (e.g., a physical mobile device) and/or emulated devices (e.g., an emulated iPhone using iOS 16.6). Functionality of the machine learning-based device matrix prediction 104 system 104 can be performed by one or more servers (e.g., a cloud-based server) and/or other computing devices.

Generally, there are thousands of operating system (OS) and device combinations that users can test when developing applications, and it would be impossible to test applications, either manually or automated, on all the combinations (e.g., because it would require too many computing resources and/or computing time). Furthermore, users (e.g., developers, testers) and systems (e.g., automated testing systems) do not know what dependencies (e.g., API packages code dependencies, library dependencies, run-time dependencies, and/or other dependencies) are used for a particular application, and nor do they know the types and/or rates of failures (e.g., caused by bugs) associated with the thousands of different OS and device combinations. Accordingly, there are too many data points (e.g., errors, device attributes, application dependencies) for a human to reasonably determine which devices and/or operating systems should be tested for a given application. The machine learning-based device matrix prediction system 104 can predict optimal and/or effective (e.g., computationally efficient) combinations of devices, operating systems, and/or other features, on which test an application. This combination can be referred to as a device matrix.

In some implementations, the machine learning-based device matrix prediction system 104 includes and/or accesses a web application which can be hosted using a PYTHON flask module. The machine learning-based device matrix prediction system 104 can utilize iterative and collaborative processes that focuses on delivering working software in short cycles and adapting to changing requirements and needs. In some implementations, the machine learning-based device matrix prediction system 104 can be accessed (e.g., by developers) by all major web browsers (e.g., Chrome, Edge, Brave.). The speed of the machine learning-based device matrix prediction system 104 is critical and may generate predictions (e.g., recommendations) within a degree of seconds. Accordingly, the machine learning-based device matrix prediction system 104 can parse testing logs in parallel with the testing. Privacy can also be an important factor, and the machine learning-based device matrix prediction system 104 may require authentication for users and restrict access to authorized personnel to prevent unauthorized access.

In a specific implementation, the machine learning-based device matrix prediction system can function to make predictions using one or more machine learning models and run-time data. For example, while an application is being tested (e.g., run-time) error logs can be generated and/or API package information can be scraped for the tested application, and that information can be used by the machine learning model(s) to predict which devices, or device matrix, should be tested (e.g., to achieve optimal or effect computational efficiency). For example, the machine learning-based device matrix prediction may predict devices that have the same and/or similar errors as the application being tested (e.g., based on the error logs). In some implementations, the testing, error log generation, API package scraping, and predictions can be performed simultaneously and/or in parallel. As used herein, device prediction can refer to predicting or recommending one or more devices (e.g., an emulated Android device) or devices matrixes.

The device storage systems 106 can function to store, retrieve, transmit, and/or otherwise communicate data with one or more other systems. In some implementations, the device storage systems 106 can function to obtain, store, and transmit devices (e.g., emulated device configurations) and associated information. For example, the device storage systems 106 can store thousands of different devices. When referring to the device storage systems 106 herein, such a reference can refer to the device storage system 106 itself (e.g., the server device and/or server software) and/or any applications executing on the device storage system 106. Functionality of the device storage systems 106 can be performed by one or more servers (e.g., a cloud-based server) and/or other computing devices.

The client systems 108 can function to receive input (e.g., user input), present information (e.g., graphical user interfaces), receive data, transmit data, and/or otherwise communicate with other systems (e.g., over a communication network). For example, the client systems 108 can function to receive and display test reports, obtain emulated devices for testing of an application, and/or the like. Functionality of the client systems 108 can be performed by one or more computing devices and/or servers (e.g., a cloud-based server).

The application testing systems 110 can function to perform application testing. As used herein, applications can refer to software applications, hardware applications, firmware applications, and/or other types of computer applications. For example, an application may comprise a mobile device application. Testing can refer to manual testing, automated testing, continuous testing, and/or other types of computer testing. For example, testing can include automated continuous testing of mobile device application on various emulated mobile devices. Functionality of the application testing systems 110 can be performed by one or more computing devices and/or servers (e.g., a cloud-based server).

FIG. 2 is a diagram 200 of an example of a machine learning-based device matrix prediction system 202. In the example of FIG. 2, the machine learning-based device matrix prediction system 202 includes a management engine 204, a device filter engine 206, a testing engine 208, a log generation engine 210, a parsing engine 212, a scraping engine 214, a machine learning model tuning engine 216, a machine learning-based device matrix prediction engine 218, a presentation engine 220, a machine learning model generation engine 222, a communication engine 224, and a machine learning-based device matrix prediction system datastore 230.

The management engine 204 is intended to represent an engine that manages (e.g., create, read, update, delete, or otherwise access) machine learning models 232, devices 234, logs 236, log components 238, scraped data 240, prediction results 242, test results 244, device filters 246, application data 248, and/or devices 250 (e.g., emulated devices). The management engine 204 can store or otherwise manage these elements 232-248 in the machine learning-based device matrix prediction system datastore 230, and/or in one or more other local and/or remote datastores. It will be appreciated that the machine learning-based device matrix prediction system datastore 230 can be a single datastore local to the machine learning-based device matrix prediction system 202 and/or multiple datastores local to the machine learning-based device matrix prediction system 202. In some embodiments, the machine learning-based device matrix prediction system datastore 230 comprises one or more local and/or remote datastores. The management engine 204 can perform any of these operations manually (e.g., by a user interacting with a GUI) and/or automatically (e.g., triggered by one or more of the engines 206-224). Like other engines described herein, some or all the functionality of the management engine 204 can be included in and/or cooperate with one or more other engines (e.g., engines 206-224) and datastores (e.g., machine learning-based device matrix prediction system datastore 230).

The device filter engine 206 is intended to represent an engine that obtains and/or defines device filters 246. Device filters 246 can include one or more filter attributes (or, parameters). Filter attributes can include application information, such as application type (e.g., mobile application) and historical data (e.g., market analytics). For example, the historical data may indicate that the most popular devices for mobile applications include Apple IOS 10 devices running OS version 14.0. However, it will be appreciated that historical data alone may not provide sufficient information for accurately determining which devices should be tested for a given application. For example, it may be computationally inefficient to waste testing cycles on the most popular device if that device is not associated with various features of the application being developed (e.g., as determined during run-time testing). In some implementations, the filter attributes can include device information, such as type of device (e.g., mobile devices), device manufacturer, OS version, screen dimension and/or other physical attributes.

In some implementations, the device filter engine 206 can function to select devices based on the filters and filter attributes. For example, device filter engine 206 can match the filter attributes to one or more devices of a set of stored devices. The device filter engine 206 can select the devices automatically (e.g., without requiring user input) and/or in response to user input (e.g., a developer interacting with a graphical user interface).

The testing engine 208 is intended to represent an engine that initiates and/or performs testing of one or more applications on one or more devices. For example, the testing engine 208 may comprise a testing environment in which to execute applications, and/or it may communicate with one or more other systems (e.g., application testing systems) to test the application.

The log generation engine 210 is intended to represent an engine that obtains and/or generates log data during run-time testing of one or more applications. Log data can include error log data. The error log data can indicate errors associated with the application and the device it is being tested on. For example, the error log data can indicate that there are errors associated with the screen size of the device (e.g., images do not display correctly). The log data can have different data formats and/or different file types. In some implementations, the log generation engine 210 can normalize different log data to a standard log format, which can allow the system 202 to operate the log data regardless of the type, format, and/or source of the log data.

The parsing engine 212 is intended to represent an engine that parses logs data. The parsed log data can include log data components (e.g., error log data components). Log data components can include, for example, the errors associated with a screen size of the device (e.g., images do not display correctly). The parsing engine 212 can parse log data in parallel with the testing of the application and/or generation of the log data.

The scraping engine 214 is intended to represent an engine that that scrapes information associated with the application and/or device the application is being tested on. For example, the scraping engine 214 can scrape API package information associated with application and/or device. The scraping engine 214 can scrape information in parallel with the testing of the application, generation of the log data, and/or parsing of the log data. The scraping engine 214 can scrape information at run-time or otherwise.

The machine learning model tuning engine 216 is intended to represent an engine that adjusts one or more weights of machine learning models. For example, the machine learning model tuning engine 216 can adjust weights of a machine learning model based on run-time data (e.g., log data, parsed information, scraped information) and/or user feedback. In some implementations, the machine learning model tuning engine 216 can use historical data to initially train a machine learning model and then subsequently adjust the weights of the machine learning model based on run-time data and/or user feedback.

The machine learning-based device matrix prediction engine 218 is intended to represent an engine that predicts (or, recommends) devices on which to test one or more applications. In some implementations, a machine learning model uses the log data components and/or the scraped information as inputs to the machine learning model, and the output of the machine learning model indicates a set of devices on which to test the one or more applications. The prediction may be performed in parallel with the application testing, parsing, and/or scraping. In one example, the machine learning model correlates the run-time error log data and/or scraped information with one or more other devices. For example, the machine learning model can process large amounts of data (e.g., more than a human could reasonably process) to correlate the run-time data with devices associated with the same and/or similar data. In some implementations, the machine learning model can identify other devices associated with the same run-time data.

In some implementations, the machine learning model can implement one or more machine learning similarity learning and/or distance algorithms to correlate the run-time data with one or more other devices. For example, the machine learning model can implement clustering, k-nearest neighbor, support vector machines, neural networks, auto-encoders, locality-sensitive hashing, and/or the like. Accordingly, the machine learning model can identify errors and dependencies that are similar to the errors and dependencies detected during run time, and then correlate (or, match) the similarities to other devices associated with the similar data. The machine learning model can also use machine learning similarity and/or distance algorithms to correlate device attributes (e.g., of the device being tested) to other devices. For example, if an error is detected at run-time with an iOS device with a 6" screen, the machine learning model can identify other types of similar devices (e.g., an Android device with a 6" or approximately 6" screen). The machine learning model can also use both similarity of run-time data and similarity of device attributes simultaneously to predict devices to test.

As used in this paper, device attributes (or, parameters) can include device type (e.g., mobile device), device manufacturer (e.g., Apple, Samsung), device version, device OS, device OS version, physical dimensions (e.g., screen size), memory type and size, processor type and speed, and/or other information defined by a device or device configuration.

It will be appreciated that some implementations may use a single machine learning model and/or a plurality of machine learning models. For example, one or more machine learning models may be used to perform the prediction of device matrixes, and one or more other machine learning models may be used to determine similarities (which can then be used by the one or more machine learning models performing the prediction).

The machine learning-based device matrix prediction engine 218 may also use one or more threshold values to predict the devices to test. For example, the machine learning model may predict devices associated with the same or similar run-time data and/or device attributes as the device currently being tested on that satisfy one or more threshold values. For example, if an error is associated with another device at an error rate or quantity that exceeds or meets a threshold value, the machine learning-based device matrix prediction engine 218 can recommend testing on that device.

Figure 8:
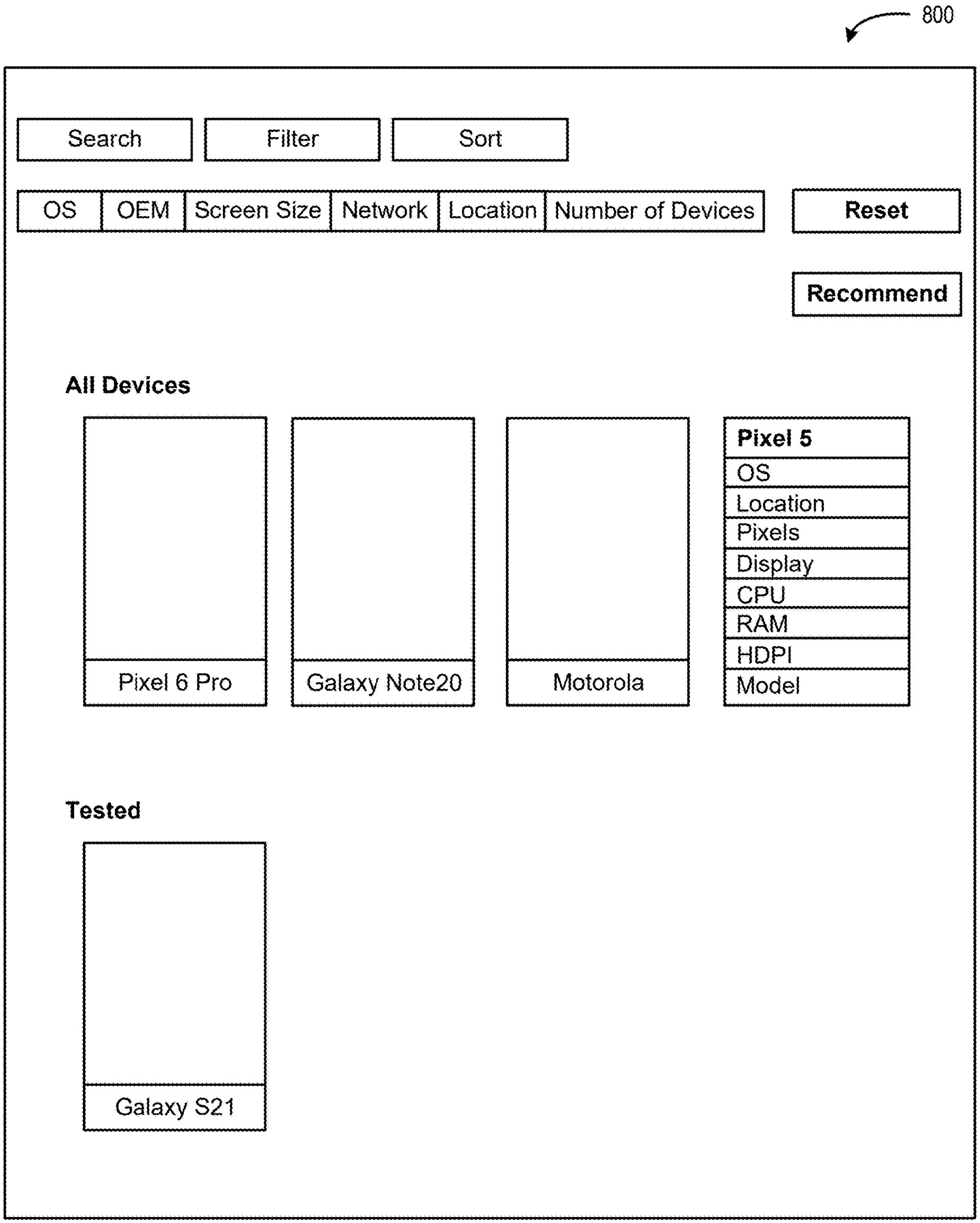
FIG. 8 is a diagram of an example graphical user interface for machine learning-based device matrix prediction.

The presentation engine 220 is intended to represent an engine that presents visual, audio, and/or haptic information. In some implementations, the presentation engine 220 generates graphical user interface components (e.g., server-side graphical user interface components) that can be rendered as complete graphical user interfaces on client systems (e.g., client systems 108). For example, the presentation engine 220 can function to present an interactive graphical user interface for display and receiving information. For example, the graphical user interface may display device filters 246 and associated options, predicted device matrixes, test parameters, and/or other information or functionality described herein. An example graphical user interface is shown in FIG. 8.

The machine learning model generation engine 222 is intended to represent an engine that generates and/or modifies one or more machine learning models 232. In some implementations, the machine learning model generation engine 222 may use a variety of machine learning techniques or algorithms to generate machine learning models 232. As used herein, machine learning can include Bayesian algorithms and/or models, deep learning algorithms and/or models (e.g., artificial neural networks, convolutional neural networks), gap analysis algorithms and/or models, supervised learning techniques and/or models, unsupervised learning algorithms and/or models, random forest algorithms and/or models, similarity learning and/or distance algorithms, and/or the like. For example, the machine learning model generation engine 222 may use a random forest algorithm to generate a random forest machine learning model.

The communication engine 224 is intended to represent an engine that sends requests, transmits and receives communications, and/or otherwise provides communication with one or more of the systems, engines, devices and/or datastores described herein. In a specific implementation, the communication engine 224 can function to encrypt and decrypt communications. The communication engine 224 can function to send requests to and receive data from one or more systems through a network or a portion of a network (e.g., CRM 102). In a specific implementation, the communication engine 224 can send requests and receive data through a connection, all or a portion of which can be a wireless connection. The communication engine 224 can request and receive messages, and/or other communications from associated systems and/or engines. In some implementations, the communication engine 224 can function to obtain devices from one or more remote systems (e.g., device storage systems) over a communication network. Communications can be stored in the machine learning-based device matrix prediction system datastore 230.

FIG. 3 is a flowchart 300 of an example of method of machine learning-based device matrix prediction. In this and other flowcharts, flow diagrams, and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed but may have been included for the sake of illustrative clarity.

In module 302, a machine learning-based testing device prediction system stores a set of emulated devices. The set of emulated devices may include a plurality of different emulated devices, such as mobile devices executing various operating systems and/or applications. For example, the set of emulated devices can include thousands of combinations of devices, operating systems, and/or applications. In some implementations, the devices may be stored remotely (e.g., on devices storage systems) and retrieved by the machine learning-based device matrix prediction system for local storage. Alternatively, the machine learning-based device matrix prediction system may operate on the devices while they are stored on the remote systems without having to store them locally.

In module 304, the machine learning-based testing device prediction system obtains one or more filter parameters.

In module 306, the machine learning-based device matrix prediction system selects, based on the filter parameters, a subset of emulated devices from the set of emulated devices.

In module 308, the machine learning-based testing device prediction system initiates testing of an application on a particular emulated device of the subset of emulated devices.

In module 310, the machine learning-based testing device prediction system obtains, at run-time while the application is being tested, first error log data from the testing of the application on the particular emulated device of the subset of emulated devices.

In module 312, the machine learning-based testing device prediction system parses, at run-time while the application is being tested, the first error log data, thereby generating a set of first error log data components.

In module 314, the machine learning-based testing device prediction system adjusts, at run-time while the application is being tested, one or more weights of a machine learning model based on the set of first error log data components.

In module 316, the machine learning-based testing device prediction system provides, at run-time while the application is being tested, the set of first error log data components to the machine learning model.

In module 318, the machine learning-based testing device prediction system determines, at run-time while the application is being tested by the machine learning model based on the set of the first error log data components, a second subset of emulated devices from the set of emulated devices. Each emulated device of the second subset of emulated devices may correlate to at least one of the first error log data components of the set of first error log data components. In some implementations, the machine learning model determines the correlation based on one or more threshold values, wherein the one or more threshold values indicate any of a quantity or a quality of the at least one first error log data component associated with the first subset of emulated devices.

In module 320, the machine learning-based device matrix prediction system tests the application on at least one of the third subset of emulated devices. The method 300 may return to module 310 to obtain subsequent error log data from the test performed in module 320. The subsequent steps may be repeated using the subsequent error log data. This process may be repeated any number of times.

In some implementations, the machine learning model may be initially trained using market analytics data and/or other historical data and may be subsequently trained using the run-time data. The system may use reinforcement learning to further refine and/or train the machine learning model.

It will be appreciated in the method 300 that some of the modules perform functionality (e.g., parsing) at run-time while the application is being tested (e.g., parsing in parallel with testing), but other implementations may perform the same functionality outside of run-time testing in addition to and/or instead of at run-time while the application is being tested.

FIGS. 4A-B is a flowchart 400 of an example of a method of machine learning-based device matrix prediction. In this and other flowcharts, flow diagrams, and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed but may have been included for the sake of illustrative clarity.

In module 402, a machine learning-based testing device prediction system stores a set of emulated devices. The set of emulated devices may include a plurality of different emulated devices, such as mobile devices executing various operating systems and/or applications.

In module 404, the machine learning-based testing device prediction system obtains one or more filter parameters.

In module 406, the machine learning-based device matrix prediction system selects, based on the filter parameters, a subset of emulated devices from the set of emulated devices.

In module 408, the machine learning-based testing device prediction system initiates testing of an application on a particular emulated device of the subset of emulated devices.

In module 410, the machine learning-based testing device prediction system obtains, at run-time while the application is being tested, first error log data from the testing of the application on the particular emulated device of the subset of emulated devices.

In module 412, the machine learning-based testing device prediction system parses, at run-time while the application is being tested, the first error log data, thereby generating a set of first error log data components.

In module 414, the machine learning-based testing device prediction system adjusts, at run-time while the application is being tested, one or more weights of a machine learning model based on the set of first error log data components.

In module 416, the machine learning-based testing device prediction system provides, at run-time while the application is being tested, the set of first error log data components to the machine learning model.

In module 418, the machine learning-based testing device prediction system determines, at run-time while the application is being tested by the machine learning model based on the set of the first error log data components, a second subset of emulated devices from the set of emulated devices. Each emulated device of the second subset of emulated devices may correlate to at least one of the first error log data components of the set of first error log data components. In some implementations, the machine learning model determines the correlation based on one or more threshold values, wherein the one or more threshold values indicate any of a quantity or a quality of the at least one first error log data component associated with the first subset of emulated devices.

In module 420, the machine learning-based device matrix prediction system tests the application on at least one of the third subset of emulated devices.

In module 422, the machine learning-based device matrix prediction system obtains, at run-time while the application is being tested on the at least one of the second subset of emulated devices, second error log data from the testing of the application on the at least one of the second subset of emulated devices.

In module 424, the machine learning-based device matrix prediction system parsing, at run-time while the application is being tested on the at least one of the second subset of emulated devices, the second error log data, thereby generating a set of second error log data components.

In module 426, the machine learning-based device matrix prediction system adjusts, at run-time while the application is being tested on the at least one of the second subset of emulated devices, one or more weights of the machine learning model based on the set of second error log data components.

In module 428, the machine learning-based device matrix prediction system provides, at run-time while the application is being tested on the at least one of the second subset of emulated devices, the set of second error log data components to the machine learning model.

In module 430, the machine learning-based device matrix prediction system determines, at run-time while the application is being tested on the at least one of the second subset of emulated devices a third subset of emulated devices from the set of emulated devices. Each emulated device of the third subset may correlate to at least one of the second error log data components of the set of second error log data components. The machine learning model may perform the determination based on the set of the second error log data components.

In module 432, the machine learning-based device matrix prediction system tests the application on at least one of the third subset of emulated devices. In some implementations, testing may be performed on one or more other systems (e.g., application testing systems) in communication with the machine learning-based device matrix prediction system.

The method 400 may return to module 422 to obtain subsequent error log data from the test performed in module 420. The subsequent steps may be repeated using the subsequent error log data. This process may be repeated any number of times.

It will be appreciated in the method 400 that some of the modules perform functionality (e.g., parsing) at run-time while the application is being tested (e.g., parsing in parallel with testing), but other implementations may perform the same functionality outside of run-time testing in addition to and/or instead of at run-time while the application is being tested.

Figure 5:
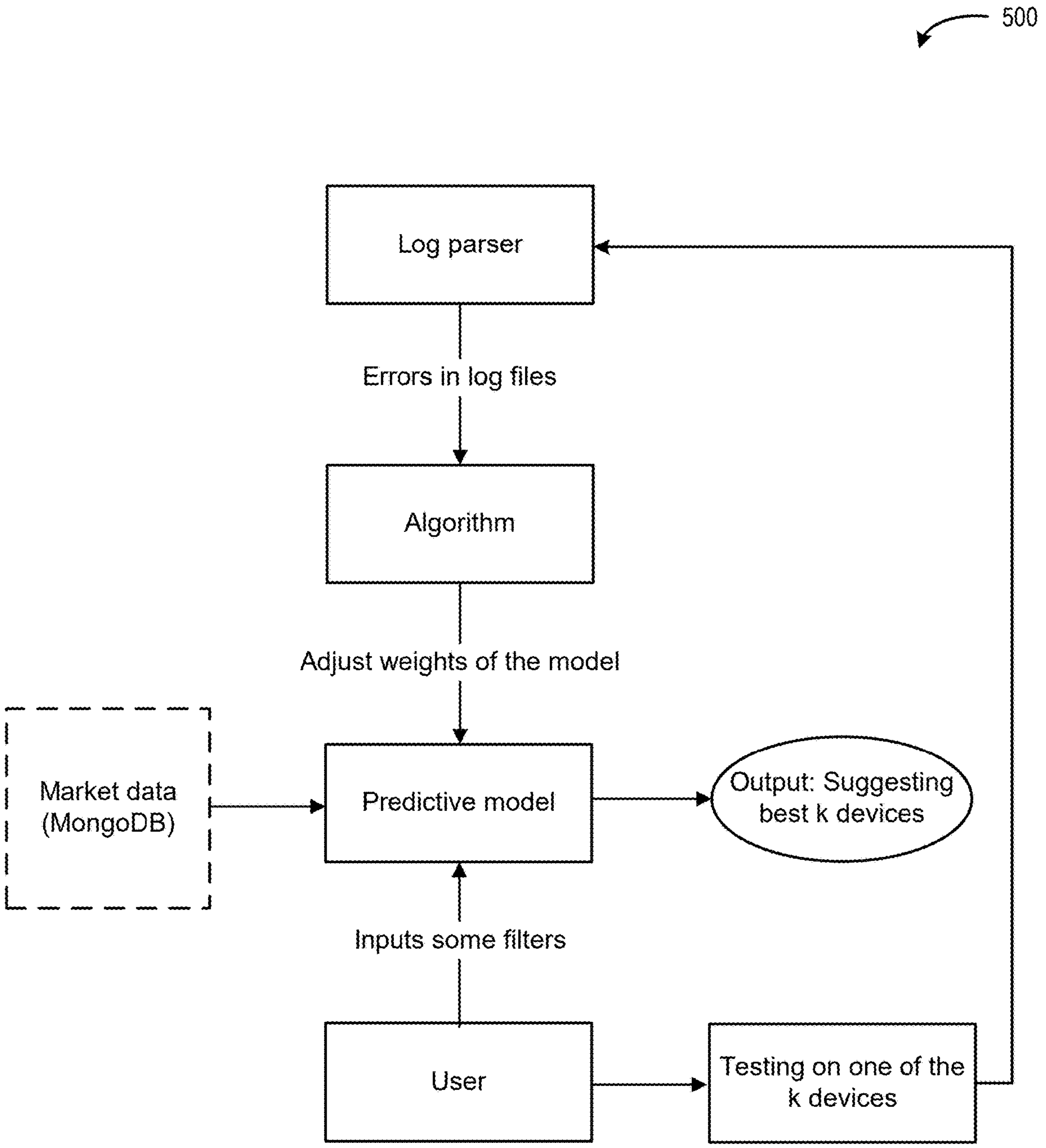
FIG. 5 is a flowchart of an example of a method of machine learning-based device matrix prediction.

FIG. 5 is a flowchart 500 of an example of a method of machine learning-based device matrix prediction. In this and other flowcharts, flow diagrams, and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed but may have been included for the sake of illustrative clarity.

As shown in FIG. 5, a user inputs one or more device filters based on which a set of devices are filtered and an optimal number (e.g., 5) of devices are generated and displayed by a machine learning-based device matrix prediction system for the user to test an application on. The user can then test the application on one or more of the devices and log data generated during testing are sent to a parser (or, parsing engine) and based on errors in the data, the machine learning-based device matrix prediction system can adjust the weights of a machine learning model of the to predict a better selection of devices.

Figure 6:
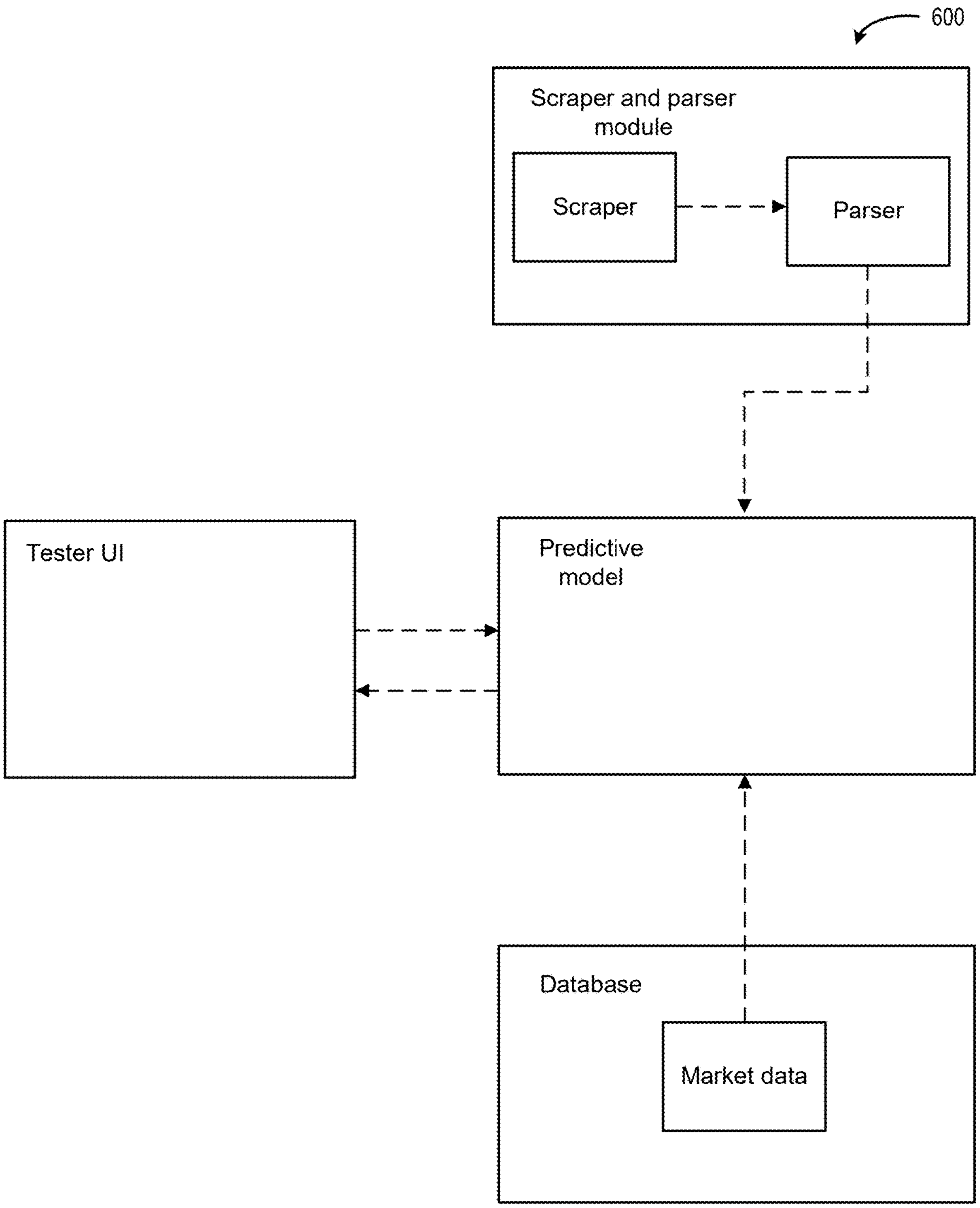
FIG. 6 is a diagram of an example of a machine learning-based device matrix prediction system.

FIG. 6 is a diagram 600 of an example of a machine learning-based device matrix prediction system.

Figure 7:
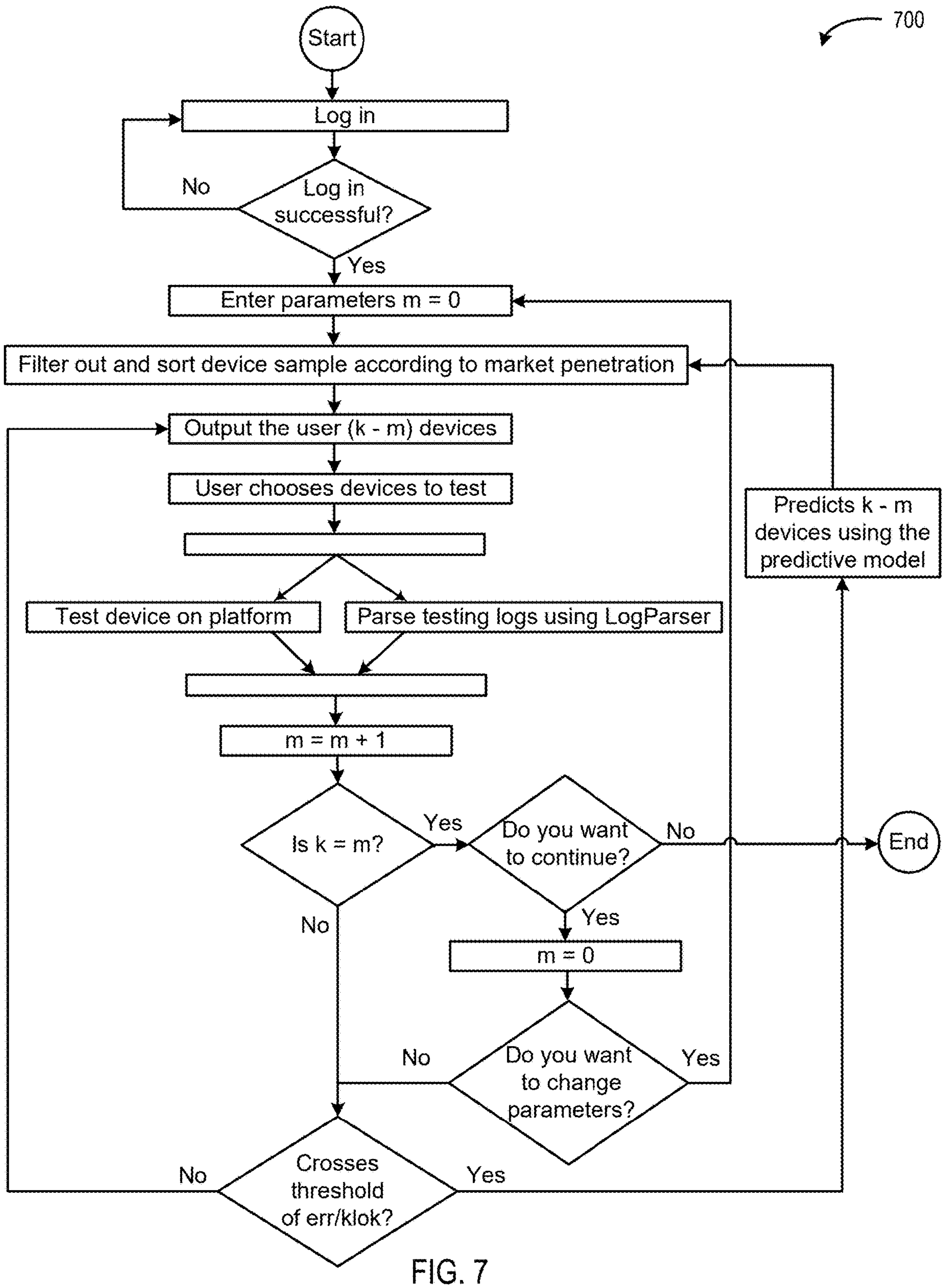
FIG. 7 is a flowchart of an example of a method of machine learning-based device matrix prediction.

FIG. 7 is a flowchart 700 of an example of a method of machine learning-based device matrix prediction. In this and other flowcharts, flow diagrams, and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed but may have been included for the sake of illustrative clarity.

FIG. 8 is a diagram 800 of an example graphical user interface for machine learning-based device matrix prediction. In the example of FIG. 8, the user interface module provides an interface for a user to interact with the system, which includes functions such as login, viewing devices and accessing the recommendation engine. The data access module provides an interface to access the database, which includes reading the data from the database for the user to view the device catalog and for the engine to recommend devices. The log parser and scraper module provides an interface for real-time parsing of log files and to scrape respective API packages based on log error data. The predictive model module provides an interface to access the engine to provide prediction of devices and be able to recommend a device matrix to the user. The business logic module provides an interface for these modules and ties it all together.

When using the system, a user may need help understanding how to use it. In some implementations, the system may implement an online or context-sensitive help. For example, there may be buttons that a user can click on to get help that is specific to what the user is doing at the moment. The system can also have user manuals and/or technical manuals for users who are using the system and for users who are working on the engine, such as programmers or technicians, respectively. This can, for example, save time, reduce frustration, and otherwise help users fully leverage the system.

Figure 9:
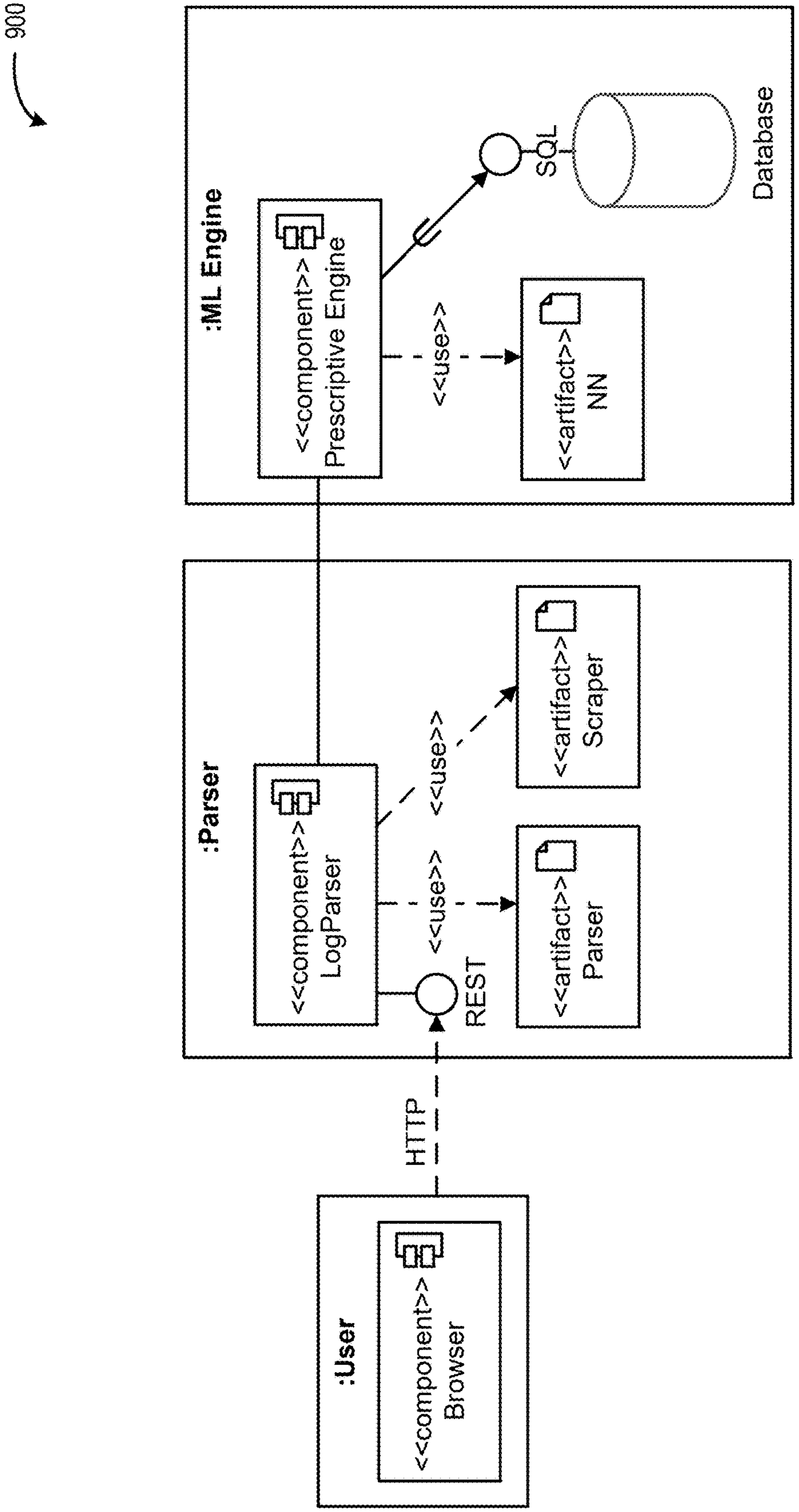
FIG. 9 is a diagram of an example of a packaging and deployment system for machine learning-based device matrix prediction.

FIG. 9 is a diagram 900 of an example of a packaging and deployment system for machine learning-based device matrix prediction.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

What is claimed is:

1. A system comprising:

one or more processors; and memory storing instructions that, when executed by the one or more processors, cause the system to perform:

storing a set of emulated devices, the set of emulated devices including a plurality of different emulated devices;

obtaining one or more filter parameters;

selecting, based on the filter parameters, a subset of emulated devices from the set of emulated devices;

initiating testing of an application on a particular emulated device of the subset of emulated devices;

obtaining, at run-time while the application is being tested, first error log data from the testing of the application on the particular emulated device of the subset of emulated devices;

parsing, at run-time while the application is being tested, the first error log data, thereby generating a set of first error log data components;

adjusting, at run-time while the application is being tested, one or more weights of a machine learning model based on the set of first error log data components;

providing, at run-time while the application is being tested, the set of first error log data components to the machine learning model;

determining, at run-time while the application is being tested, by the machine learning model based on the set of the first error log data components, a second subset of emulated devices from the set of emulated devices, wherein each emulated device of the second subset of emulated devices correlates to at least one of the first error log data components of the set of first error log data components;

testing the application on at least one emulated device of the second subset of emulated devices.

2. The system of claim 1, wherein the testing includes executing the application.

3. The system of claim 1, wherein the machine learning model determines the correlation based on one or more threshold values, wherein the one or more threshold values indicate any of a quantity or a quality of the at least one first error log data component associated with the first subset of emulated devices.

4. The system of claim 1, wherein the instructions further cause the system to perform:

obtaining, at run-time while the application is being tested on the at least one emulated device of the second subset of emulated devices, second error log data from the testing of the application on the at least one emulated device of the second subset of emulated devices;

parsing, at run-time while the application is being tested on the at least one emulated device of the second subset of emulated devices, the second error log data, thereby generating a set of second error log data components;

adjusting, at run-time while the application is being tested on the at least one emulated device of the second subset of emulated devices, one or more weights of the machine learning model based on the set of second error log data components;

providing, at run-time while the application is being tested on the at least one emulated device of the second subset of emulated devices, the set of second error log data components to the machine learning model;

determining, at run-time while the application is being tested on the at least one emulated device of the second subset of emulated devices, by the machine learning model based on the set of the second error log data components, a third subset of emulated devices from the set of emulated devices, wherein each emulated device of the third subset of emulated devices correlates to at least one of the second error log data components of the set of second error log data components;

testing the application on at least one emulated device of the third subset of emulated devices.

5. The system of claim 1, wherein the filtering is based on historical data associated with any of the emulated devices and the application.

6. The system of claim 1, wherein the emulated devices comprise emulated mobile devices.

7. The system of claim 1, wherein the instructions further cause the system to perform:

scraping one or more API packages, and wherein the machine learning model uses both the error log data and the scraped data to perform the determinations.

8. The system of claim 1, wherein the first and second error log data comprise different types of log data.

9. The system of claim 1, wherein the initiated testing is performed on a plurality of different emulated devices, and wherein the subsequent steps use the plurality of different emulated devices.

10. The system of claim 1, wherein the first and second error log data are associated with one or more device attributes, and wherein the one or more device attributes include any of operating system and screen size.

11. A method implemented by a computing system including one or more processors and storage media storing machine-readable instructions, wherein the method is performed using the one or more processors, the method comprising:

storing a set of emulated devices, the set of emulated devices including a plurality of different emulated devices;

obtaining one or more filter parameters;

selecting, based on the filter parameters, a subset of emulated devices from the set of emulated devices;

initiating testing of an application on a particular emulated device of the subset of emulated devices;

obtaining, at run-time while the application is being tested, first error log data from the testing of the application on the particular emulated device of the subset of emulated devices;

parsing, at run-time while the application is being tested, the first error log data, thereby generating a set of first error log data components;

adjusting, at run-time while the application is being tested, one or more weights of a machine learning model based on the set of first error log data components;

providing, at run-time while the application is being tested, the set of first error log data components to the machine learning model;

determining, at run-time while the application is being tested, by the machine learning model based on the set of the first error log data components, a second subset of emulated devices from the set of emulated devices, wherein each emulated device of the second subset of emulated devices correlates to at least one of the first error log data components of the set of first error log data components;

testing the application on at least one emulated device of the second subset of emulated devices.

12. The method of claim 11, wherein the testing includes executing the application.

13. The method of claim 11, wherein the machine learning model determines the correlation based on one or more threshold values, wherein the one or more threshold values indicate any of a quantity or a quality of the at least one first error log data component associated with the first subset of emulated devices.

14. The method of claim 11, further comprising:

obtaining, at run-time while the application is being tested on the at least one emulated device of the second subset of emulated devices, second error log data from the testing of the application on the at least one emulated device of the second subset of emulated devices;

parsing, at run-time while the application is being tested on the at least one emulated device of the second subset of emulated devices, the second error log data, thereby generating a set of second error log data components;

adjusting, at run-time while the application is being tested on the at least one emulated device of the second subset of emulated devices, one or more weights of the machine learning model based on the set of second error log data components;

providing, at run-time while the application is being tested on the at least one emulated device of the second subset of emulated devices, the set of second error log data components to the machine learning model;

determining, at run-time while the application is being tested on the at least one emulated device of the second subset of emulated devices, by the machine learning model based on the set of the second error log data components, a third subset of emulated devices from the set of emulated devices, wherein each emulated device of the third subset of emulated devices correlates to at least one of the second error log data components of the set of second error log data components;

testing the application on at least one emulated device of the third subset of emulated devices.

15. The method of claim 11, wherein the filtering is based on historical data associated with any of the emulated devices and the application.

16. The method of claim 11, wherein the emulated devices comprise emulated mobile devices.

17. The method of claim 11, further comprising:

scraping one or more API packages, and wherein the machine learning model uses both the error log data and the scraped data to perform the determinations.

18. The method of claim 11, wherein the first and second error log data comprise different types of log data.

19. The method of claim 11, wherein the initiated testing is performed on a plurality of different emulated devices, and wherein the subsequent steps use the plurality of different emulated devices.

20. The method of claim 11, wherein the first and second error log data are associated with one or more device attributes, and wherein the one or more device attributes include any of operating system and screen size.

21. A non-transitory computer readable medium comprising instructions that, when executed, cause one or more processors to perform:

storing a set of emulated devices, the set of emulated devices including a plurality of different emulated devices;

obtaining one or more filter parameters;

selecting, based on the filter parameters, a subset of emulated devices from the set of emulated devices;

initiating testing of an application on a particular emulated device of the subset of emulated devices;

obtaining, at run-time while the application is being tested, first error log data from the testing of the application on the particular emulated device of the subset of emulated devices;

parsing, at run-time while the application is being tested, the first error log data, thereby generating a set of first error log data components;

adjusting, at run-time while the application is being tested, one or more weights of a machine learning model based on the set of first error log data components;

providing, at run-time while the application is being tested, the set of first error log data components to the machine learning model;

determining, at run-time while the application is being tested, by the machine learning model based on the set of the first error log data components, a second subset of emulated devices from the set of emulated devices, wherein each emulated device of the second subset of emulated devices correlates to at least one of the first error log data components of the set of first error log data components;

testing the application on at least one emulated device of the second subset of emulated devices.

* * * * *